US008550349B2

(12) United States Patent
Flickner et al.

(10) Patent No.: US 8,550,349 B2
(45) Date of Patent: Oct. 8, 2013

(54) SYSTEM FOR RECOVERING A BARCODE

(75) Inventors: Myron D. Flickner, San Jose, CA (US);
Nimrod Megiddo, Palo Alto, CA (US);
Christopher A. Mildebrandt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/218,294

(22) Filed: Aug. 25, 2011

(65) Prior Publication Data
US 2013/0048731 A1 Feb. 28, 2013

(51) Int. Cl.
*G06K 7/10* (2006.01)
(52) U.S. Cl.
USPC ................................ 235/462.01; 235/462.25
(58) Field of Classification Search
USPC ..................................................... 235/462.01
See application file for complete search history.

(56) References Cited

U.S. PATENT DOCUMENTS

| 6,157,328 | A | 12/2000 | Lu et al. |
| 7,395,961 | B2 | 7/2008 | Challa et al. |
| 7,680,705 | B2 | 3/2010 | Healy et al. |
| 7,693,744 | B2 | 4/2010 | Forbes |
| 7,726,571 | B2 | 6/2010 | Madej |
| 2001/0006191 | A1 | 7/2001 | Hecht et al. |
| 2003/0066891 | A1 | 4/2003 | Madej et al. |
| 2007/0272755 | A1 | 11/2007 | Chang et al. |
| 2009/0078772 | A1 | 3/2009 | Ofek et al. |
| 2010/0134332 | A1 | 6/2010 | Basappa et al. |
| 2010/0189367 | A1 | 7/2010 | van der Merwe et al. |
| 2012/0089364 | A1* | 4/2012 | Takabayashi ................ 702/167 |

FOREIGN PATENT DOCUMENTS

WO 2010011449 10/2010

OTHER PUBLICATIONS

"QR Code", Wikipedia.com, 7 pages. Available at http://en.wikipedia.org/wiki/QR_Code, last accessed Aug. 25, 2011.
Semacode, copyright 2011, Semacode Corporation, 1 page. Available at http://semacode.com/, last accessed Aug. 25, 2011.
Microsoft Tag, Copyright 2011 Microsoft Corporation, 1 page. Available at http://tag.microsoft.com/consumer/index.aspx, last accessed Aug. 25, 2011.
ScanLife, copyright 2007-2009, Scanbuy Inc., 1 page. Available at http://web.scanlife.com/us_en/, last accessed Aug. 25, 2011.
GS1 DataBar, copyright 2011, GS1 US, 1 page. Available at http://www.gs1us.org/standards/barcodes/gs1_databar, last accessed Aug. 25, 2011.
RedLaser, copyright 2009-2011, eBay Inc., 3 pages. Available at http://www.redlaser.com/, last accessed Aug. 25, 2011.

(Continued)

*Primary Examiner* — Christopher Stanford
(74) *Attorney, Agent, or Firm* — Jeffrey T. Holman

(57) ABSTRACT

A barcode recovery system, including: an image processor configured to determine a binary vector corresponding to a blurry barcode image by: maximizing an objective function that models the system using splines. Optimizing the objective function may be efficiently accomplished by constraining a search on each bit in the barcode image to a nearby range of influence of other bits in the barcode image. Further efficiency may be gained by enumerating the local groups of bits in graycode order and by adding or subtracting values from a precomputed inner product matrix to state variables to compute the complete objective function.

20 Claims, 6 Drawing Sheets

(56) References Cited

OTHER PUBLICATIONS

"Universal Product Code" Wikipedia.com, 11 page. Available at http://en.wikipedia.org/wiki/Universal_Product_Code, last accessed Aug. 25, 2011.
Unser "Splines: a perfect fit for signal and image processing" Signal Processing Magazine, vol. 16, Issue 6, (Aug. 2002), pp. 22-38.
Rao "Linear Statistical Inference and its Applications", 1973 (ISBN 0471708232).
Esedoglu, "Blind Deconvolution of Bar Code Signals", Inverse Problems 20, (2004), pp. 121-135.
Dumas et al. "A Robust Method for Blind Deconvolution of Barcode Signals and Nonuniform Illumination Estimation," 4 pages, available at http://www.ann.jussieu.fr/~dumas/Proc8.pdf, last accessed Aug. 25, 2011.
Kim et al "Joint nonuniform illumination estimation and deblurring for bar code signals" Optical Society of America, (2007), 21 pages.
Witmann "Decreasing Blur and Increasing Resolution in Barcode Scanning" IMA Industrial Problems Seminar, (2004), 16 pages.
Addiati "Restoration of Out of Focus Barcode Images Using Wiener Filter" Fifth International Conference on Signal Image Technology and Internet Based Systems, (2009), 5 pages.
Gaubatz et al. "Barcode-Based Calibration of a 1-D Blur Restoration Pipeline" HP Laboratories, (2010), 5 pages.
IBM et al. "A Method of Providing Error Handling Information of a Digital Equipment Using a Two-Dimensional Bar Code and a Cellular Phone" ip.com Prior Art Database, (2006), 4 pages.

\* cited by examiner

SYSTEM FOR RECOVERING A BARCODE

BACKGROUND

Improved image processing capabilities in mobile devices, such as mobile phones, allows mobile devices to perform various operations on digital images, typically taken with a digital camera connected to or built into the mobile devices. For example, mobile devices may be able to read a barcode by capturing a digital image of the barcode and reading the digital image to extract a readable binary code from the barcode image.

Digital images taken with cameras in mobile devices can frequently experience a significant amount of blur. Images with blur are more difficult to read, and generally require more computational resources than images with no blur. Because blurry images use more computational resources, mobile devices and other devices with limited computational resources can take a long time to recover a binary code from the blurry image, making such a process impractical.

SUMMARY

Embodiments of a system are described. In one embodiment, the system is a barcode recovery system. The system includes: an image processor configured to determine a binary vector corresponding to a blurry barcode image by: enumerating the binary vector in graycode order to enable an exhaustive search of an objective function by adding pre-computed values of an inner product matrix to state variables; and constraining the search on each bit in the barcode image to a nearby range of influence of other bits in the barcode image. Other embodiments of the system are also described.

Embodiments of a computer program product are also described. In one embodiment, the computer program product includes a computer readable storage device to store a computer readable program, wherein the computer readable program, when executed by a processor within a computer, causes the computer to perform operations for recovering bits of a blurred barcode image. The operations include: determining a binary vector corresponding to the barcode image by: enumerating the binary vector in graycode order to enable an exhaustive search of an objective function by adding pre-computed values of an inner product matrix to state variables; and constraining the search on each bit in the barcode image to a nearby range of influence of other bits in the barcode image. Other embodiments of the computer program product are also described.

Embodiments of a method are also described. In one embodiment, the method is a method for recovering bits of a blurred barcode image. The method includes: determining a binary vector corresponding to the barcode image by: enumerating the binary vector in graycode order to enable an exhaustive search of an objective function by adding pre-computed values of an inner product matrix to state variables; and constraining the search on each bit in the barcode image to a nearby range of influence of other bits in the barcode image. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
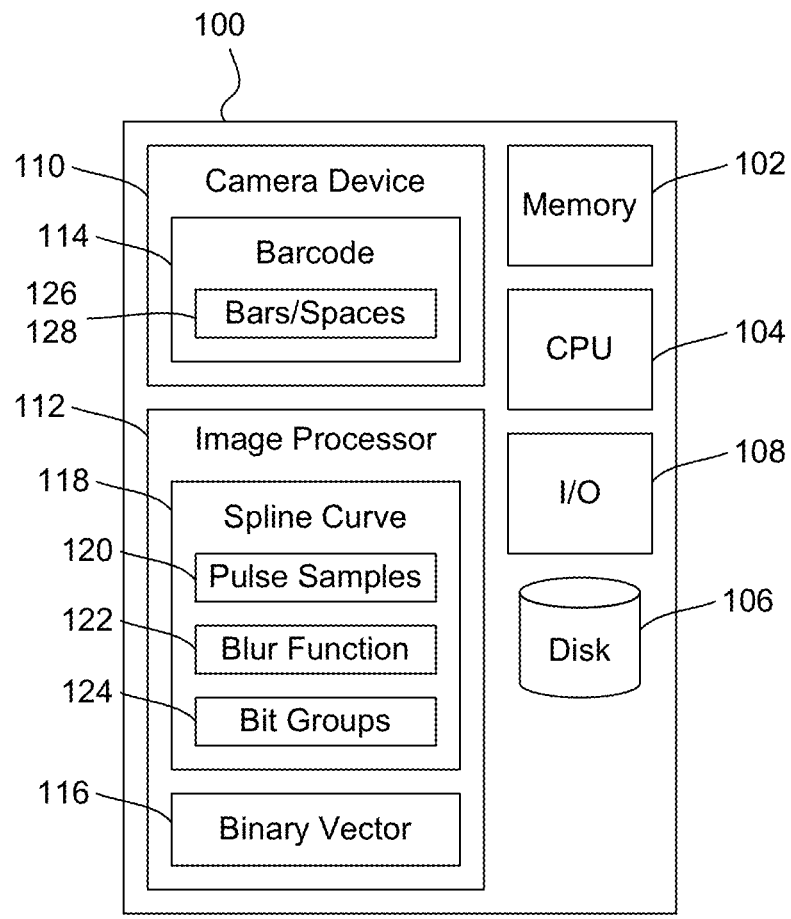
FIG. 1 depicts a schematic diagram of one embodiment of a barcode recovery system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for recovering bits of a blurred barcode image. More specifically, the system uses a spline-based algorithm that reduces the amount of computational resources needed to accurately recover a vector corresponding to the barcode, and to increase the speed at which a device may recover the vector. In various embodiments, the vector may be a binary or a non-binary vector.

Conventional systems for recovering blurry binary systems are not able to decode blurred barcodes in real time in devices with low computational power that is typical of many mobile phones or other mobile devices. Conventional systems that use adaptive thresholding, pattern matching, or other techniques each have advantages for particular applications, but may suffer from performance issues when decoding barcodes with focus blur or when used in devices with low computational power, resulting in the development of new barcodes, such as the Microsoft Tag code, to work around these deficiencies. However, Universal Product Code (UPC) or International Article Number (EAN) barcodes are very widely used. The system described herein provides a solution for focus blur and computational issues encountered when using mobile devices to decode barcodes.

Figure 5:
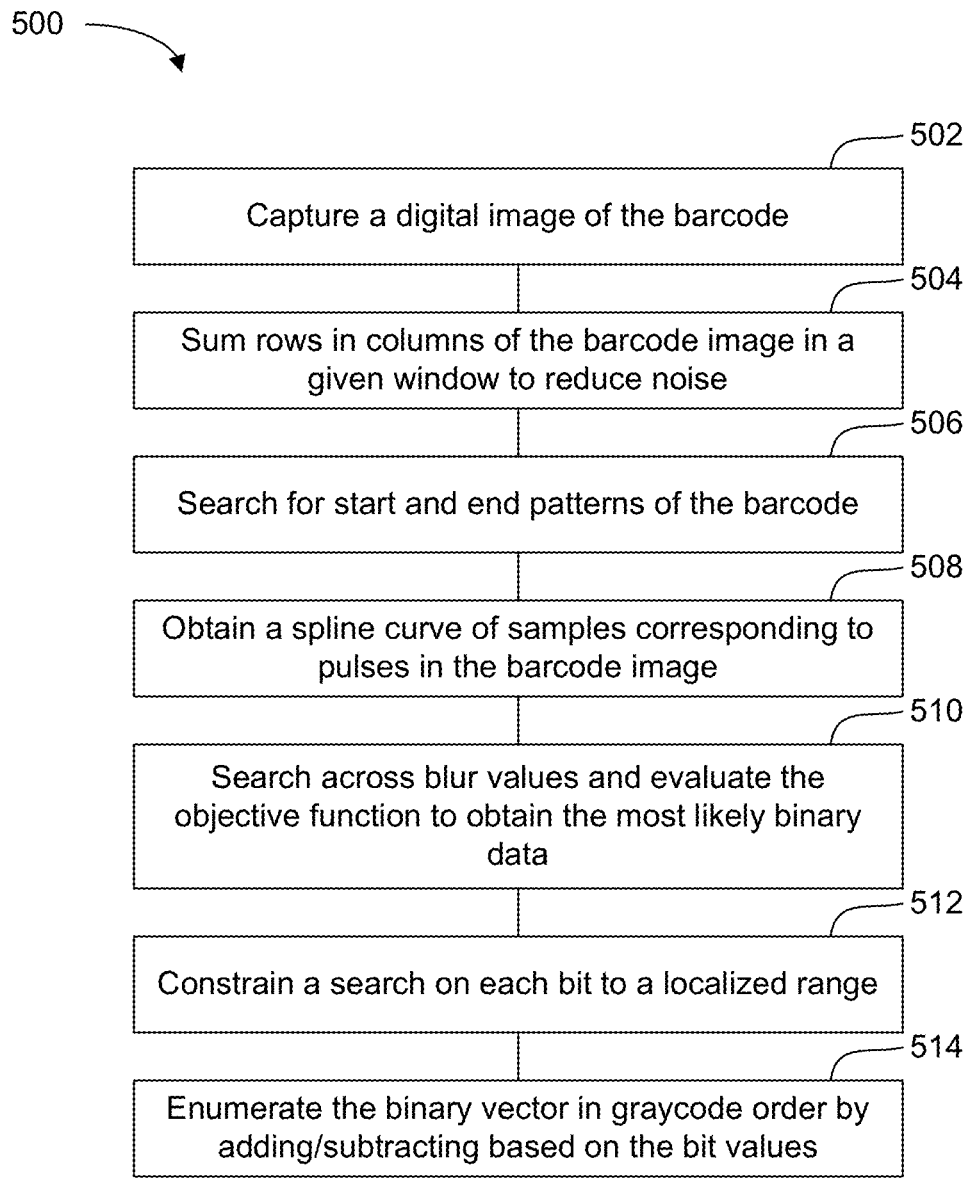
FIG. 5 depicts a flow chart diagram of one embodiment of a method for recovering bits of a blurred barcode image.

FIG. 1 depicts a schematic diagram of one embodiment of a barcode recovery system 100. The depicted barcode recovery system 100 includes various components, described in more detail below, that are capable of performing the functions and operations described herein. In one embodiment, at least some of the components of the barcode recovery system 100 are implemented in a computer system. For example, the functionality of one or more components of the barcode recovery system 100 may be implemented by computer program instructions stored on a computer memory device 102 and executed by a processing device 104 such as a CPU. The barcode recovery system 100 may include other components, such as a disk storage drive 106, input/output devices 108, a camera device 110, and an image processor 112. Some or all of the components of the barcode recovery system 100 may be stored on a single computing device or on a network of computing devices. The barcode recovery system 100 may include more or fewer components or subsystems than those depicted herein. In some embodiments, the barcode recovery system 100 may be used to implement the methods described herein as depicted in FIG. 5.

In one embodiment, the barcode recovery system 100 includes a camera device 110 and an image processor 112. The camera device 110 and image processor 112 may be coupled together and/or to other devices or components. The barcode recovery system 100 may include more or fewer components than depicted herein. The barcode recovery system 100 is configured to determine a binary vector 116 corresponding to a barcode image taken using the camera device 110.

In one embodiment of the barcode recovery system 100, the camera device 110 is integrated in a mobile device, such as a mobile phone. In another embodiment, the camera device 110 is a stand-alone device that may be connected to a computer or other device capable of processing images provided by the camera device 110. The camera device 110 captures a digital image of the barcode 114. The camera device 110 may be a digital camera configured to capture digital images. The digital images may be stored in the memory device 102 and sent to the image processor 112 so that the barcode recovery system 100 may begin recovering the binary vector 116 from the image. The barcode 114 may include bars 126 and spaces 128 to represent the different bits in the barcode 114.

Because digital images taken with mobile devices frequently experience focus blur due to the barcode 114 being out of focus in the image. The digital images may also experience motion blur from motion of the camera while capturing the image. Blurred barcodes 114 can be much more difficult to decode than focused or sharp barcodes 114, and can thus require high amounts of computational resources using conventional methods.

In one embodiment, the barcode recovery system 100 includes an image processor 112. In some embodiments, the image processor 112 may be separate from the CPU 104. In other embodiments, the CPU 104 may also process images. The image processor 112 may perform some or all of the decoding operations, or the CPU 104 may perform some of the decoding operations in conjunction with the image processor 112.

In one embodiment, the image processor 112 obtains a spline curve 118 of the barcode image by taking samples 120 of each of the pulses in the barcode 114. The pulses may represent the bars—binary values of 1—in the barcode image. In one embodiment, the number of samples 120 taken per pulse is an integer ratio. Taking an integer ratio of samples 120 per pulse allows the algorithm to be performed much faster. After taking the samples 120, the spline curve 118 may be fitted to the samples 120 to form a continuous curve 118 between a beginning and an end of the barcode 114. In one embodiment, Unser's recursive filter—as explained in "B-spline signal processing. II. Efficiency design and applications"—is used to fit the spline curve 118 to the given samples 120. In another embodiment, the spline curve 118 may be fitted by solving a linear system.

Once the spline curve 118 is obtained, the image processor 112 may then search over a range of possible blur values for the barcode image and evaluate an objective function corresponding to the computed spline curve 118 to find the most likely binary vector 116 for the barcode image. The image processor 112 may save the blur function 122 to the memory device 102 for use as a starting point for subsequent iterations of operations on the barcode image.

In one embodiment, the image processor 112 partitions the barcode 114 into groups 124 of bits or pulses. Partitioning the barcode 114 into smaller groups 124 of bits and enumerating the groups 124 of bits in graycode order to compute the objective function using adds/subtracts rather than inner products significantly reduces the computation time to decode the barcode 114 and may also increase the accuracy of the decoding process. Enumerating the bits in graycode order according to their respective groups 124 allows the barcode recovery system 100 to update by adding/subtracting pre-computed values from state variables to maximize an objective function rather than doing full inner products of the entire range of bits in the barcode 114 results in a large savings of computation. Additionally, the image processor 112 may retain intermediary values as states to allow the image processor 112 to quickly and accurately decode the barcode image.

The groups 124 of bits may depend on the blur function 122 determined by the barcode recovery system 100. In one embodiment, each bit only has a local influence, such that blur from a single bit can only affect bits within a distance identified in the blur function 122. In one embodiment, the blur is localized to 5-8 bits nearest to the blurred bit. In other embodiments, the blur may be more than 8 bits or less than 5 bits, and may cover any range of bits. Smaller amounts of blur result in fewer bits needed for each group 124, which may result in faster decoding of the barcode image. In some embodiments, the groups 124 of bits may overlap other groups 124 of bits. In some embodiments, the blurred barcode image also has an offset that may be accounted for when obtaining the spline curve 118 from the samples 120. Correcting the offset improves the accuracy of the determination of the binary vector 116.

Figure 2:
FIG. 2 depicts a schematic diagram of one embodiment of a barcode.

FIG. 2 depicts a schematic diagram of one embodiment of a barcode 114. The barcode 114 may be any barcode 114 for identification of products, objects, applications, or otherwise. In one embodiment, the barcode 114 has a series of bars 126 and spaces 128 to represent digits corresponding to a binary sequence. A bar 126 represents a binary value of 1 and a space 128 represents a binary value of 0. While the system 100 is described herein for use with binary barcodes 114, the system 100 may be used with other types of barcodes 114, including alphanumeric bar codes or otherwise.

In one embodiment, the barcode recovery system 100 removes noise from the barcode image before obtaining samples 120 to create the spline curve 118. Given a window 200 in a barcode 114, summing the columns of the window 200 reduces the noise present in the barcode image. This may be generalized to summing over columns of a rotated window 200. This operation is also called a Radon transform, as referenced in U.S. Pat. No. 5,136,660 to Flickner et al., which is herein incorporated for reference. Cropping the top and bottom of the barcode image may help eliminate or reduce noise present in the image. In one embodiment, the barcode recovery system 100 detects a vertical midpoint of the barcode 114 in the image and crops the image to a window 200 that includes 4-8 scanlines above and below the vertical midpoint, resulting in a vertical window size of 8-16 scanlines. The window 200 may have a length sufficient to include a beginning and an end of the barcode 114.

The barcode 114 may also include start and end patterns at the beginning and end of the barcode 114, respectively. In some embodiments, the barcode 114 may include other position-identifying patterns in between the beginning and end of the barcode 114. In one embodiment, the barcode recovery system 100 attempts to identify these patterns before attempting to decode the rest of the barcode 114. The start and end patterns may help the barcode recovery system 100 estimate or compute the width of the barcode 114 in the barcode 114 or the width of the barcode 114 within the barcode image. In one embodiment, the start pattern has a binary value of 000101 and the end pattern has a binary value of 101000. The start and end patterns may have values according to standard protocols for UPC barcodes 114 or for some other type of barcode 114. When the barcode recovery system 100 has identified the position-identifying patterns, the system 100 may identify the rest of the binary vector 116.

Figure 3:
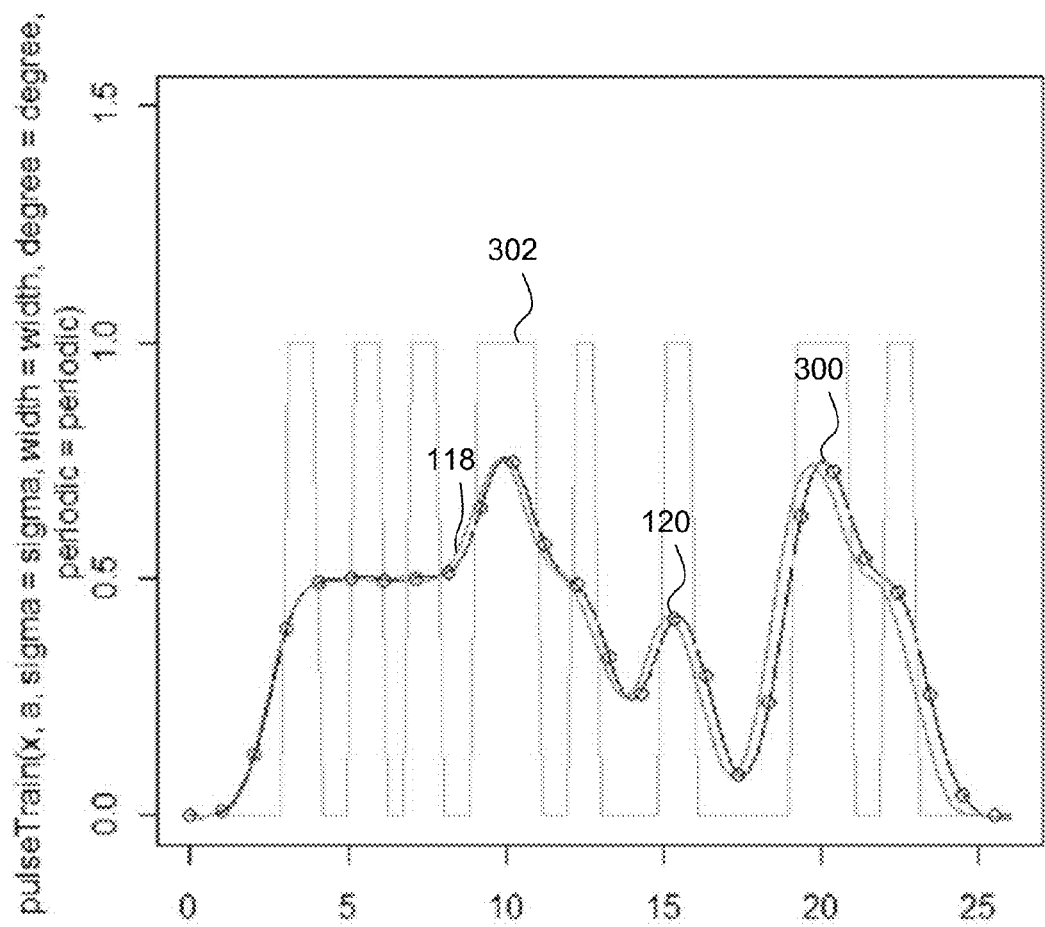
FIG. 3 depicts a graph diagram of one embodiment of a spline curve of a blurred binary signal.

FIG. 3 depicts a schematic diagram of one embodiment of a spline curve 118 of a blurred binary signal 300. The barcode recovery system 100 obtains samples 120 for each of the pulses in the pulse train 302 corresponding to the barcode 114.

The pulse train 302 represents the barcode 114 as a binary vector 116. Each pulse represents a binary value of 1 or a series of binary values of 1. Consequently, a single up-pulse may contain one or more binary values of 1 representing one or more consecutive bars 126 in the barcode 114. Each trough or down-pulse represents one or more binary values of 0, such that a single trough may contain one or more spaces 128 in the barcode 114.

The barcode recovery system 100 may obtain an integer value of samples 120 for each pulse—up-pulses and down-pulses—which may help reduce the computational resources needed to decode the barcode 114. The ratio of samples 120 to pulses may be any integer value. While the ratio of samples 120 to pulses may be a non-integer value, non-integer values may require more computational power and may consequently slow down decoding time of the barcode 114.

Once the blurred binary signal 300 has been sampled, the spline curve 118 may be obtained by applying Unser's recursive filter to the samples 120. This may shift the resulting spline curve 118 from the blurred binary signal 300. The offset may be identified by the barcode recovery system 100 and may be stored for later use by the system 100.

Figure 4:
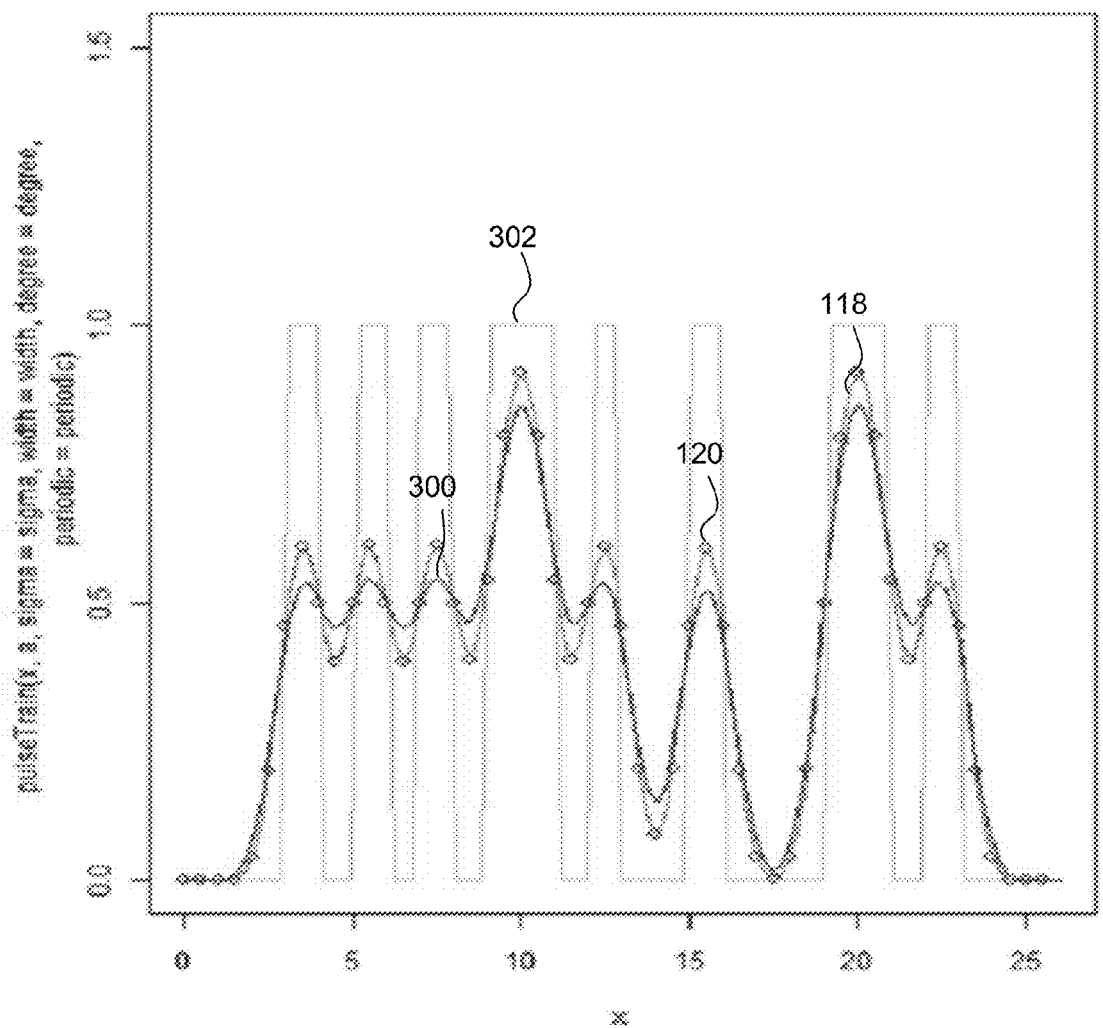
FIG. 4 depicts a graph diagram of one embodiment of a fitted spline curve of the blurred binary signal of FIG. 3.

FIG. 4 depicts a schematic diagram of one embodiment of a fitted spline curve 118 of the blurred binary signal 300 of FIG. 3. After obtaining the spline curve 118 for the samples 120 taken from the blurred binary signal 300, the spline curve 118 may be fitted to the binary signal pulse train 302 so that the binary vector 116 may be more easily extracted from the continuous spline curve 118. In one embodiment, the barcode 114 is extracted using one or more tables or matrices of values for certain inner products of the spline curve 118 over a range of blur values, offset values, and barcode width value. When the matrices have been computed, the barcode recovery system 100 may use the computed matrices to solve for the binary vector 116 by maximizing an objective function.

FIG. 5 depicts a flow chart diagram of one embodiment of a method for recovering bits of a blurred barcode image. Although the method 500 is described in conjunction with the barcode recovery system 100 of FIG. 1, embodiments of the method 500 may be implemented with other types of barcode recovery systems 100.

In one embodiment, the barcode recovery system 100 captures 502 a digital image of the barcode 114. The barcode recovery system 100 may include a camera device 110 to capture the image. In another embodiment, the camera device 110 is separate from the barcode recovery system 100. The barcode recovery system 100 may be capable of processing or altering digital images in order to decode the barcode 114 from the image.

In one embodiment, the barcode recovery system 100 sums 504 the top several rows of the barcode image to reduce noise in the image. In one embodiment, the barcode recovery system 100 sums columns of the barcode image within a given window 200 in any area of the barcode image to reduce the noise.

The barcode recovery system 100 may search 506 for start and end patterns for the barcode 114. The start and end patterns may allow the barcode recovery system 100 to compute a width of the barcode 114 in the image. In some embodiments, when the width of the barcode 114 has been found, the barcode recovery system 100 normalizes the width to a value of 1 for making additional computations for the blur, offset, or other parameters. In other embodiments, the barcode recovery system 100 may assume that the width is fixed through the width of the barcode 114. The barcode 114 may include other position-identifying patterns that allow the barcode recovery system 100 to break the barcode 114 into smaller parts or perform other operations on the barcode 114.

In one embodiment, the barcode recovery system 100 obtains 508 a spline curve 118 fitted to the samples 120 corresponding to pulses in the barcode image. In one embodiment, the spline curve 118 includes an integer ratio of samples 120 to pulses. In some embodiments, further operations may be performed on the spline curve 118 to cause curved portions within the spline curve 118 to better represent the pulses in the barcode 114. Searching 510 across blur values and evaluating the objective function for the specific spline curve 118 and samples 120 corresponding to the barcode image may help obtain the most likely binary data for the barcode image.

The barcode recovery system 100 may utilize the property that a blur function only affects a local region for each bit to constrain 512 a search. The blur function 122 may identify a range of influence that the bits in the barcode 114 may have. The range of influence may be limited to a certain number of bits near the blurred bit, such that the blur from a single bit may only reach bits within a certain distance of the bit. In one embodiment, the blur influence for a single bit may be limited to a range of 5-8 bits, such that the bit may only have a range of influence that affects 2-4 bits in any direction. In one embodiment, the barcode 114 may be partitioned according to the blur function 122 for performing recovery operations, such that the barcode recovery system 100 performs operations on groups 124 of 5-8 bits (or according to the actual blur influence for a given barcode 114). Partitioning the bits may allow the barcode recovery system 100 to increase the recovery speed. The groups 124 may then be combined in any manner, though in one embodiment, the groups at least partially overlap.

The barcode recovery system 100 may also enumerate 514 the binary vector 116 for the given spline curve 118 corresponding to the barcode 114 in graycode order by adding and subtracting based on the bit values to update the recovered binary vector 116 as the barcode recovery system 100 iterates through the spline curve 118 to recover the full binary vector 116.

One embodiment of the system 100 and method described herein is described below. The barcode recovery system 100 recovers an unknown barcode 114 that has undergone significant blur typical of what may be captured from a mobile phone camera device 110. A degradation model for a blurred version of a binary signal 300 is shown:

$$y_m(t) = \alpha G(t,\sigma) \star f(t) + \epsilon(t)$$

where $f(t)$ is the binary input signal, $G(t,\sigma)$ is the blurring function, $\star$ denotes convolution and $\epsilon(t)$ represents the noise in the image. The information provided in $y(t)$ may allow the recovery of $f(t)$, $\alpha$, $\sigma$. When using uniform B-splines for various components for the binary signal, the $n^{th}$ degree B-spline basic function is denoted as:

$$N_i^n(t) = N^n(t-i).$$

In one embodiment, the measured signal is assumed to be a cubic B-spline curve 118 denoted as:

$$y_m(t) = \sum_{i=0}^{K} c_i N_i^{n_1}(t) = \vec{c}^T \vec{N}^{n_1}(t)$$

where $\vec{c}, \vec{N}$ are vectors of control points and spline basis functions, respectively. For the rest of the derivation, the summation notation is dropped in favor of the vector notation, i.e., $\Sigma_i^K = 0 c_i b_i$ is written as $\vec{c}^T \vec{b}$. $f(t)$, an unknown signal, may be model as a spline function at an unknown scale $w$ and offset $\tau$, i.e., $$f(t) = \vec{a}^T \vec{N}^{n_2}\left(\frac{t-\tau}{w}\right).$$

The blurring function may also be a spline $$G^{n_3}(t,\sigma) = \frac{1}{\sigma} N^{n_3}\left(\frac{t}{\sigma}\right)$$

for an unknown $\sigma$. The full model is $$\vec{c}^T \vec{N}^{n_1} = \frac{\alpha}{\sigma} N^{n_3}\left(\frac{t}{\sigma}\right) \star \vec{a}^T \vec{N}^{n_2}\left(\frac{t-\tau}{w}\right)$$

and may be rewritten as $$\vec{c}^T \vec{N}^{n_1} = \frac{\alpha}{\sigma} \vec{a}^T \left(N^{n_3}\left(\frac{t}{\sigma}\right) \star \vec{N}^{n_2}\left(\frac{t-\tau}{w}\right)\right).$$

Let $$\mathcal{P}_0^{n_4}(t,\sigma,\tau,w) = \frac{1}{\sigma} N^{n_3}\left(\frac{t}{\sigma}\right) \star N_0^{n_2}\left(\frac{t-\tau}{w}\right)$$

be the pulse function of the system. This is the system response from a single pulse. When uniform splines are used, $\mathcal{P}_i(t,\sigma,w,\tau) = \mathcal{P}_0(t-iw,\sigma w,\tau)$, allowing the total model to be written as a simple inner product of pulse functions.

$$\vec{c}^T \vec{N}^{n_1} = \alpha \vec{a}^T \vec{\mathcal{P}}^{n_4}(t,\sigma,\tau,w)$$

It may be noted that $\mathcal{P}_i(t,\sigma,w,\tau)$ can typically be solved for in closed form, resulting in a spline function that is fast to evaluate.

It may also be shown that $n_4 = n_2 + n_3 + 1$, the degree of the pulse function is the sum of the degrees of the underlying signal, the blur function and 1 more due to the integration arising from convolution.

The values of $\alpha,\sigma,\tau,w,\vec{a}$ for the right hand side that best match the measured signal on the left hand side are required. Using least squares and an $l_2$ norm, an error function is defined that can be minimized.

$$e(t,\alpha,\sigma,\tau,w) = \int (\vec{c}^T \vec{N}(t) - \alpha \vec{a}^T \vec{\mathcal{P}}(t,\sigma,w,\tau))^2 dt$$

Expanding the error function results in three terms $e(t,\alpha,\sigma,w,\tau) = e_1 + e_2 + e_3$ $$e_1(t) = \vec{c}^T \left[\int \vec{N}(t) \vec{N}^T(t) dt\right] \vec{c} = \vec{c}^T H \vec{c}$$

$$e_2(t,\alpha,\sigma,\tau,w) = -2\alpha \vec{c}^T \left[\int \vec{N}(t) \vec{\mathcal{P}}^T(.) dt\right] \vec{a} = -2\alpha \vec{c}^T B \vec{a}$$

$$e_3(t,\alpha,\sigma,\tau,w) = \alpha^2 \vec{a}^T \left[\int \vec{\mathcal{P}}(.) \vec{\mathcal{P}}^T dt\right] \vec{a} = \alpha^2 \vec{a}^T Y \vec{a}$$

After integrating out $t$, the error in a matrix notation can be written as $$e(\alpha,\sigma,\tau,w) = \vec{c}^T H \vec{c} - 2\alpha \vec{c}^T B \vec{a} + \alpha^2 \vec{a}^T Y \vec{a}.$$

H is a symmetric banded Toeplitz matrix with non-negative entries, a B-spline Gram matrix that only depends on the spline basis selected. B,Y are matrices of piecewise polynomial functions that depend on $\sigma,\tau,w$.

The equation shown above for error is a quadratic in $\alpha$ that will have a minimum at $$\alpha = \frac{\vec{c}^T B \vec{a}}{\vec{a}^T Y \vec{a}}$$

Substituting this back into the previous equation results in $$e(\sigma,\tau,w) = \vec{c}^T H c - \frac{(\vec{c}^T B \vec{a})^2}{\vec{a}^T Y \vec{a}}$$

Minimizing $e(.)$ is the same as maximizing the second term, since H, Y are symmetric Toeplitz matrices with non-negative entries which are positive definite. If periodic boundary conditions are chosen, H and Y are also circulant. The end result is that unknown parameters can be found by maximizing $$\max_{\sigma,u,\tau} \frac{(\vec{c}^T B \vec{a})^2}{\vec{a}^T Y \vec{a}}$$

Given a B,Y and for $\vec{a} \in \Re^M$, this has a known solution—as described in "Linear Statistical Inference and its applications" to Rao—which is $$\sup_{\vec{a} \in \mathbb{R}^M} \frac{(\vec{c}^T B \vec{a})^2}{\vec{a}^T Y \vec{a}} = \vec{c}^T B Y^{-1} B^T \vec{c}$$

and is obtained when $\vec{a} = Y^{-1} B^T \vec{c}$.

One efficient way to find $\vec{a}$ is to solve the linear system $Y\vec{a}=B^T\vec{c}$. One approach to the maximization problem includes searching the σ,τ,w space, and at each iteration, building the needed matrices and solving the linear system. However, this may still be computationally too expensive to run on a phone. That can be solved by applying this general result to the specific problem of barcodes.

To read barcodes using spline-based deconvolution, the specific structure of barcodes and blurring typical of a focus blur may be exploited. Barcodes are binary signals, so f(t) may be modeled as a 0th order spline function—$a_i$ is a binary vector and $n_2=0$.

$$f(t) = \vec{a}^T \vec{N}^0\left(\frac{t-\tau}{w}\right)$$

The barcode is assumed to have fixed pitch w shifted by τ. The blurring function is a single spline basis function $$G^n(t, \sigma) = \frac{n+1}{\sigma} N^n\left(\frac{(n+1)t}{\sigma} + \frac{n+1}{2}\right),$$

which is centered at 0 with nonzero width σ. Also note that $\int G^n(t,\sigma)dt=1$ which is why this particular scaling is used. A starting choice for n may be 2—giving a degree 3 pulse function. Different values of n can be used to see if a smoother blurring function improves results.

Finding $\vec{c}$ given the image samples can be done by solving the linear system, $H\vec{c}=\vec{p}$, or using Unser's recursive filter.

The underlying pulse function suitable for fast evaluation can be derived by doing the integration needed to compute the convolution. By using standard calculus change of variables, it can be shown that for any degree spline, the integration has the closed form suitable for fast evaluation.

$$\mathcal{P}_0^n(t, \sigma, \tau, w) = \mathcal{N}^n\left(\frac{n+1}{\sigma}(t-\tau) + \frac{n+1}{2}\right) - \mathcal{N}^n\left(\frac{n+1}{\sigma}(t-\tau-w) + \frac{n+1}{2}\right)$$

where $$\mathcal{N}^n(x) = \int_0^x N_0^n(t)\,dt = \begin{cases} 0 & x \le 0 \\ \sum_{i=0}^n N_i^{n+1}(x) & 0 < x < n+1 \\ 1 & x \ge n+1 \end{cases}$$

an elegant representation of the uniform B-spline integral. Note, this can be symbolically computed as a piecewise polynomial. For example for degree 2 splines we have $$\mathcal{N}^2(t) = \begin{cases} 0 & x \le 0 \\ \frac{t^3}{6} & 0 < x \le 1 \\ \frac{-2t^3 + 9t^2 - 9t + 3}{6} & 1 < x \le 2 \\ \frac{t^3 - 9t^2 + 27t - 21}{6} & 2 < x < 3 \\ 1 & x \ge 3 \end{cases}$$

Since uniform splines are used, the pulse functions are shifted by an integer multiple of the width of the underlying square pulse i.e. $\mathcal{P}_i^n(t,w)=\mathcal{P}_0^n(t-iw)$.

Figure 6:
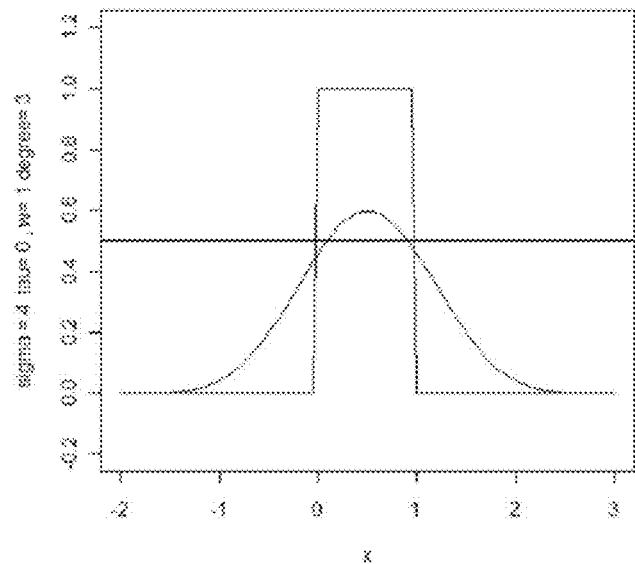
FIG. 6 depicts a graph diagram of one embodiment of a pulse in a spline curve.
Figure 7:
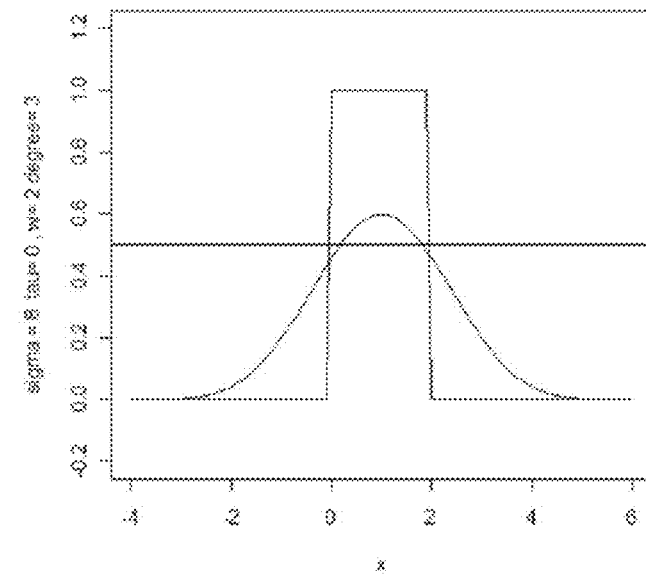
FIG. 7 depicts a graph diagram of one embodiment of a pulse in a spline curve.

FIGS. 6 and 7 depict graph diagrams of embodiments of a pulse in a spline curve 118. It is instructive to note that $$\mathcal{P}_i^n(t, \sigma, \tau, w) = \mathcal{P}_i^n\left(\frac{t}{w}, \frac{\sigma}{w}, \tau, 1\right)$$

as can be seen in the plots 600, 700 in FIGS. 6 and 7 of $\mathcal{P}_0^3(t,4,1,0)$ and $\mathcal{P}_0^3(t,8,2,0)$, respectively, that differ only in the scale of the x-axis.

τ,w may be estimated from the least squares fit spline signal, $\vec{c}^T N$, as follows. Find the location of first and last peaks $\rho_L=\tau+w/2$ and $\rho_R=\tau+w/2+K^*w$ where K is the distance between the leftmost and rightmost peaks in the expected barcode 114. This gives $$w = \frac{\rho_R - \rho_L}{K}$$

and $$\tau = \rho_L - w/2.$$

For the UPC barcode K=95−1=94, i.e. the distance between the center of the rightmost and leftmost start pulse is 94 pulse units. This can be further verified by searching for the peaks/valleys of the start and stop pulse using w to estimated the starting point. This calculation also validates the variation of barcode width when printed on a curved surface such as a can.

$\vec{c}$ may be translated such that τ=0. This can be computed exactly using least squares where $\vec{c}_0$ is the unknown.

$$\min \int (\vec{c}^T \vec{N}(t) - \vec{c}_0^T \vec{N}(t-\tau))^2 dt$$

Setting the derivative to 0 gives the expression $2\vec{c}^T G = 2\vec{c}_0^T H$ or since H,G are symmetric and $F\vec{c}=H\vec{c}_0$ where H,G are inner product matrices with elements computed as $$h_{i,j}=\int N^n(t-1)N^n(t-j)dt=N^{2n}(i-j)$$

and $$g_{i,j}=\int N^n(t-i-\tau)N^n(t-j)dt=N^{2n}(i-j-\tau).$$

From the above expression, it may be shown that integer τ causes G to be a shifted version of H, which is equivalent to applying a permutation matrix which corresponds to an index shift $\vec{c}$. The fractional part can be computed apriori from a table of a few values by computing $H^{-1}G\vec{c}$ or solving the linear system. For cubic splines the nonzero entries for the symmetric Toeplitz matrix G are show below. H can be created using the number for tau=0. The matrix is circulant if the curve 118 is periodic—which is one way to handle the boundary conditions.

|  | $i-j=0$ | $\|i-j\|=1$ | $\|i-j\|=2$ | $\|i-j\|=3$ | $\|i-j\|=4$ |
|---|---|---|---|---|---|
| tau = .1 | 0.4760428 | 0.2708243 | 0.03264268 | 0.0003866501 | 1.984127e – 11 |
| tau = .2 | 0.4662078 | 0.3057174 | 0.04380371 | 0.0007109283 | 2.539683e – 09 |
| tau = .3 | 0.4502463 | 0.3400134 | 0.05759719 | 0.0012446631 | 4.339286e – 08 |
| tau = .4 | 0.4287738 | 0.3726635 | 0.07427822 | 0.0020889371 | 3.250794e – 07 |
| tau = .5 | 0.4025964 | 0.4025964 | 0.09402437 | 0.0033776662 | 1.550099e – 06 |
| tau = .6 | 0.3726635 | 0.4287738 | 0.11690803 | 0.0052816660 | 5.554286e – 06 |
| tau = .7 | 0.3400134 | 0.4502463 | 0.14287109 | 0.0080109192 | 1.634014e – 05 |
| tau = .8 | 0.3057174 | 0.4662078 | 0.17170414 | 0.0118143416 | 4.161016e – 05 |
| tau = .9 | 0.2708243 | 0.4760428 | 0.20303225 | 0.0169763489 | 9.490018e – 05 |
| tau = 0 | 0.4793650794 | 0.2363095238 | 0.0238095238 | 0.0001984127 | |

This transformation may be used to evaluate different values of τ using the B,Y computed with τ=0.

Illumination variation may be removed by normalizing the signal to 0,1 on a sliding window. A form of rank order filtering includes looking at the max & min envelope over a window and picking a scale such that the normalized signal is between 0 & 1.

When computing Y and B, further inspection of B=∫$\vec{N}$(t) $\vec{\mathcal{P}}^T$(t,σ,τ,w)dt gives insight on how to effective build the matrix. B is an s×p matrix with s≥p and entries $$b_{i,j}=\int N_i^{n1} \mathcal{P}_j^n(t,\sigma,w)dt.$$

There are two scales for this matrix—the s-dimensional columns are in the interval 0 to s of the underlying B-spline basis function used to fit the image data to a curve. The p dimensional rows are the pulse functions scaled to the interval 0 to s. The entries can be computed by doing the integration for w=1 and scaling the result. The matrix depends on U and the sampling ratio, ᴦ =s/p=dim(c)/dim(a), that represents the number of fitted spline control points per pulse. If ᴦ is an integer then B is column Toeplitz-like, each column shifted by ᴦ. If ᴦ is not an integer the matrix is banded but not Toeplitz. In the case that ᴦ is not an integer, the signal can be resampled to force this constraint. When ᴦ is an integer, since B is banded Toeplitz-like, only a singled column of non-zero inner product for the typical sampling ratios is needed. These inner products can be pre-computed for likely values of sigma and stored as a small table.

The construction of Y=∫$\vec{\mathcal{P}}$(t,σ,τ,w) $\vec{\mathcal{P}}$(t,σ,τ,w) dt with entries $$v_{i,j}=\int \mathcal{P}_i^n(t,\sigma,\tau,w)\,\mathcal{P}(t,\sigma,\tau w)dt$$

can be simplified by observing that Y is a p×p banded symmetric Toeplitz matrix. Since $$\mathcal{P}_i^n(t, \sigma, 0, 1) = \mathcal{P}_i^n\left(\frac{t}{w}, \frac{\sigma}{w}, 0, 1\right),$$

a table can be pre-built over a range of σ with w=1. The table values can then be scaled to the measured values of w,σ at runtime. The table only needs the non-zero values from one row since Y is banded symmetric Toeplitz. For example, below is the table for Y(σ,0,1) with 0.2≤σ≤5.0 by 0.2 and a degree 2 blur.

```
//
// pulse function inner product table for degree 2 blur functions
// sigma runs from .2 to 5 by .2 ; width = 1
//
const static double pipTable[ ][6] = {
  { 9.6206349206349562e-01, 1.8968253968254280e-02 }, // sigma=0.2
  { 9.2412698412698469e-01, 3.7936507936508566e-02 }, // sigma=0.4
  { 8.8619047619047620e-01, 5.6904761904762409e-02 }, // sigma=0.6
  { 8.4825396825396704e-01, 7.5873015873016536e-02 }, // sigma=0.8
  { 8.1031746031746010e-01, 9.4841269841270684e-02 }, // sigma=1.0
  { 7.7238219246871920e-01, 1.1380828373015919e-01, 6.2003968253970975e-07 },
  // sigma=1.2
  { 7.3450739197723636e-01, 1.3271483024497663e-01, 3.1473766397140041e-05 },
  // sigma=1.4
  { 6.9699062317137417e-01, 1.5126334508260100e-01, 2.4134333171285457e-04 },
  // sigma=1.6
  { 6.6035447558081173e-01, 1.6893123870490126e-01, 8.9152350469222949e-04 },
  // sigma=1.8
  { 6.2514260912698372e-01, 1.8517485119047547e-01, 2.2538442460318417e-03 },
  // sigma=2.0
  { 5.9176701153963052e-01, 1.9958221113900443e-01, 4.5342667617595455e-03,
  1.6329424405126266e-08 }, // sigma=2.2
  { 5.6046481662326075e-01, 2.1191737583705447e-01, 7.8489757719501681e-03,
  1.2400793650794339e-06 }, // sigma=2.4
  { 5.3132233074410729e-01, 2.2210347504156380e-01, 1.2222252213445261e-02,
  1.3107372948522913e-05 }, // sigma=2.6
```

```
{ 5.0431854068294646e-01, 2.3018885129428396e-01, 1.7588930831447285e-02,
6.2947532794280068e-05 }, // sigma=2.8
{ 4.7936507936507927e-01, 2.3630952380952408e-01, 2.3809523809523815e-02,
1.9841269841269901e-04 }, // sigma=3.0
{ 4.5633620662348556e-01, 2.4065441654788086e-01, 3.0694795201224732e-02,
4.8268321487367541e-04, 1.7242772238599006e-09 }, // sigma=3.2
{ 4.3508914908302654e-01, 2.4343748546422003e-01, 3.8031141393066646e-02,
9.8664519481115112e-04, 1.5340638250922432e-07 }, // sigma=3.4
{ 4.1547702400004199e-01, 2.4487745158077448e-01, 4.5602849528994890e-02,
1.7793267712892264e-03, 1.8601190476191319e-06 }, // sigma=3.6
{ 3.9735659020059572e-01, 2.4518410022305243e-01, 5.3210163398535910e-02,
2.9173667359668797e-03, 1.0074542217324276e-05 }, // sigma=3.8
{ 3.8059256417410114e-01, 2.4455004495287733e-01, 6.0681297665554336e-02,
4.4370620969743976e-03, 3.5313197544642996e-05 }, // sigma=4.0
{ 3.6505973445096329e-01, 2.4314671992436085e-01, 6.7878046440805154e-02,
6.3509454477860029e-03, 9.4420624599474240e-05, 3.3729602191727677e-10 },
// sigma=4.2
{ 3.5064371378496884e-01, 2.4112329775464708e-01, 7.4696371248570800e-02,
8.6483820262259429e-03, 2.1005941921974503e-04, 3.2658848810264100e-08 },
// sigma=4.4
{ 3.3724088256154300e-01, 2.3860742242977451e-01, 8.1063806943378794e-02,
1.1298939805697048e-02, 4.0896216577476080e-04, 4.2737464638922150e-07 },
// sigma=4.6
{ 3.2475787874256151e-01, 2.3570693788074362e-01, 8.6935240881787182e-02,
1.4257332029797060e-02, 7.1906967768365553e-04, 2.4801587301588428e-06 },
// sigma=4.8
{ 3.1311085714286208e-01, 2.3251206349208256e-01, 9.2288126984125751e-02,
1.7468749206348739e-02, 1.1663746031746864e-03, 9.2571428571430526e-06
}};// sigma=5.0
```

If B,Y are known, then $\vec{a}$ may be found using the objective function $$\max_a \frac{(\vec{c}^T B \vec{a})^2}{\vec{a}^T Y \vec{a}}$$

Solving the linear system, $Y\vec{a} = B^T\vec{c}$, does not constrain $\vec{a}$ to be binary or positive. Experimental results show that the unconstrained solutions can deviate significantly from the constrained solution. This can be significantly improved by using non-negative least squares to force $\vec{a}$ to be positive.

By exploiting two constraints—first that $\vec{a}$ is binary, and second that the pulse functions involved have compact support—a very efficient search algorithm may be used. Compact support assures that not all possible $\vec{a}$ vectors need to be evaluated, since bits sufficiently far away cannot affect each other—i.e., if the optimal solution has bit 5=1 then value of bit 40 cannot make bit 5=0 unless the pulse function width exceeds 35, which is a very large blur. Secondly, since $\vec{a}$ is binary, there is a very fast way to evaluate the objective function. First, by compute and storing $\vec{c}^T B$, setting $\vec{a}=0$ for every unconstrained bit, and computing and saving the bilinear form. Then, changing 1 bit and updating the bilinear form uses a single add or subtraction operation. A similar approach may be used with a quadratic form in the denominator, and state variables may be used to compute the true merit function. By enumerating $\vec{a}$ in graycode order and keeping a few intermediary values instead of 2^n inner products, there are 2^n adds—a significant savings. However, enumeration of all of $\vec{a}$ is not needed, rather only a window of $\vec{a}$ of a few bits related to the support of the pulse function σ+w, which results in significant computation savings.

An embodiment of a barcode recovery system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation for recovering bits of a blurred barcode image.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. A computer readable storage medium or device is a specific type of computer-readable or -usable medium. Examples of a computer-readable storage medium include a semiconductor or solid state memory, magnetic tape, a removable computer diskette, a random access memory (RAM), a read-only memory (ROM), a rigid magnetic disk, and an optical disk. Hardware implementations including computer readable storage media also may or may not include transitory media. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
  a non-transitory computer readable storage device to store a computer readable program, wherein the computer readable program, when executed by a processor within a computer, causes the computer to perform operations for recovering bits of a blurred barcode image, the operations comprising:
    determining a binary vector corresponding to the barcode image by:
      enumerating the binary vector in graycode order to enable an exhaustive search of an objective function by adding pre-computed values of an inner product matrix to state variables; and
      constraining the search on each bit in the barcode image to a nearby range of influence of other bits in the barcode image.

2. The computer program product of claim 1, wherein the computer program product, when executed on the computer, causes the computer to perform additional operations, comprising:
  summing columns of the barcode image to reduce noise from the barcode image.

3. The computer program product of claim 1, wherein constraining the search on each bit further comprises:
  partitioning the binary vector into groups of bits, wherein the groups of bits are enumerated individually; and
  combining the enumerated groups of bits, wherein at least some of the groups of bits overlap other groups of bits.

4. The computer program product of claim 3, wherein each group of bits comprises a number of bits determined by a blur function for the barcode image.

5. The computer program product of claim 4, wherein each group comprises 5-8 bits.

6. The computer program product of claim 3, wherein at least some of the groups of bits overlap other groups of bits.

7. The computer program product of claim 1, wherein the computer program product, when executed on the computer, causes the computer to perform additional operations, comprising:
  obtaining a spline curve of samples corresponding to pulses in the barcode image, wherein the spline curve comprises an integer ratio of samples per pulse.

8. A method for recovering bits of a blurred barcode image, comprising:
  determining a binary vector corresponding to the barcode image by:
    enumerating the binary vector in graycode order to enable an exhaustive search of an objective function by adding pre-computed values of an inner product matrix to state variables; and
    constraining the search on each bit in the barcode image to a nearby range of influence of other bits in the barcode image.

9. The method of claim 8, further comprising:
  summing columns of the barcode image to remove noise from the barcode image.

10. The method of claim 8, wherein constraining the search on each bit further comprises:
  partitioning the binary vector into groups of bits, wherein the groups of bits are enumerated individually; and
  combining the enumerated groups of bits, wherein at least some of the groups of bits overlap other groups of bits.

11. The method of claim 10, wherein each group of bits comprises a number of bits determined by a blur function for the barcode image.

12. The method of claim 11, wherein each group comprises 5-8 bits.

13. The method of claim 10, wherein at least some of the groups of bits overlap other groups of bits.

14. The method of claim 8, further comprising:
  obtaining a spline curve of samples corresponding to pulses in the barcode image, wherein the spline curve comprises an integer ratio of samples per pulse.

15. A barcode recovery system, comprising:
  an image processor configured to determine a binary vector corresponding to a blurry barcode image by:
    enumerating the binary vector in graycode order to enable an exhaustive search of an objective function by adding pre-computed values of an inner product matrix to state variables; and
    constraining the search on each bit in the barcode image to a nearby range of influence of other bits in the barcode image.

16. The system of claim 15, wherein the image processor is further configured to:
  sum columns of the barcode image to remove noise from the barcode image.

17. The system of claim 15, wherein constraining the search on each bit further comprises:
  partition the binary vector into groups of bits determined by a blur function for the barcode image, wherein the groups of bits are enumerated individually; and
  combine the enumerated groups of bits.

18. The system of claim 17, wherein each group of bits comprises a number of bits determined by a blur function for the barcode image.

19. The system of claim 17, wherein at least some of the groups of bits overlap other groups of bits.

20. The system of claim 15, wherein the image processor is further configured to:
 obtain a spline curve of samples corresponding to pulses in the barcode image, wherein the spline curve comprises an integer ratio of samples per pulse.

* * * * *